US008960628B2

(12) United States Patent
Stanic et al.

(10) Patent No.: US 8,960,628 B2
(45) Date of Patent: Feb. 24, 2015

(54) ADJUSTING DEVICE, IN PARTICULAR HEIGHT OR LONGITUDINAL ADJUSTING DEVICE FOR MOTOR VEHICLE SEATS

(75) Inventors: Ivica Stanic, Dormagen (DE); Oliver Kuntz, Wermelskirchen (DE); Christian Sturm, Krefeld (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 220 days.

(21) Appl. No.: 13/635,070

(22) PCT Filed: Mar. 8, 2011

(86) PCT No.: PCT/EP2011/053462
§ 371 (c)(1),
(2), (4) Date: Nov. 15, 2012

(87) PCT Pub. No.: WO2011/113725
PCT Pub. Date: Sep. 22, 2011

(65) Prior Publication Data
US 2013/0200665 A1 Aug. 8, 2013

(30) Foreign Application Priority Data
Mar. 17, 2010 (DE) .......................... 10 2010 002 964

(51) Int. Cl.
*F16M 13/00* (2006.01)
(52) U.S. Cl.
USPC ........... 248/424; 248/157; 248/419; 248/422; 297/330; 297/344.17
(58) Field of Classification Search
USPC .................. 248/424, 429, 157, 419, 422; 296/65.15, 65.17; 297/330, 344.17
See application file for complete search history.

(56) References Cited

U.S. PATENT DOCUMENTS

| 5,303,983 | A | 4/1994 | Gauger |
| 6,244,660 | B1 | 6/2001 | Yoshimatsu |
| 6,648,704 | B1* | 11/2003 | Fontanille ...................... 440/75 |
| 6,915,998 | B2* | 7/2005 | Borbe et al. ................... 248/429 |
| 7,303,223 | B2* | 12/2007 | Nakamura et al. ......... 296/65.15 |
| 7,325,851 | B2* | 2/2008 | Ito et al. ..................... 296/65.13 |
| 7,775,592 | B2 | 8/2010 | Becker et al. |
| 7,971,937 | B2* | 7/2011 | Ishii et al. ..................... 297/330 |
| 2009/0243326 | A1* | 10/2009 | Kimata et al. ............. 296/65.15 |

FOREIGN PATENT DOCUMENTS

| DE | 693 16 00 T2 | 8/1998 |
| DE | 10 2006 020 174 A1 | 11/2007 |

(Continued)

OTHER PUBLICATIONS

International Search Report dated Dec. 28, 2011 as received in corresponding PCT Application No. PCT/EP2011/053462, 6 pages.

*Primary Examiner* — Amy J. Sterling
(74) *Attorney, Agent, or Firm* — Foley & Lardner LLP

(57) ABSTRACT

An adjusting device, in particular a height or longitudinal adjusting device for motor vehicle seats, including a threaded spindle that is rotatably mounted in a gearbox housing at one end and in a receiving unit at the other end, the receiving unit having an inner thread that is adapted to the spindle thread. The adjusting device also includes a motor unit that is operatively connected to the threaded spindle. An adjusting device and a seat base frame for motor vehicle seats with an adjusting device that transmits forces that occur in the event of a crash to the required degree are provided. A reinforcing element is provided in the gearbox housing such that said element is suitable for receiving forces that act in the longitudinal axial direction of the threaded spindle in the event of a crash.

17 Claims, 6 Drawing Sheets

(56) References Cited

FOREIGN PATENT DOCUMENTS

Figure 1:
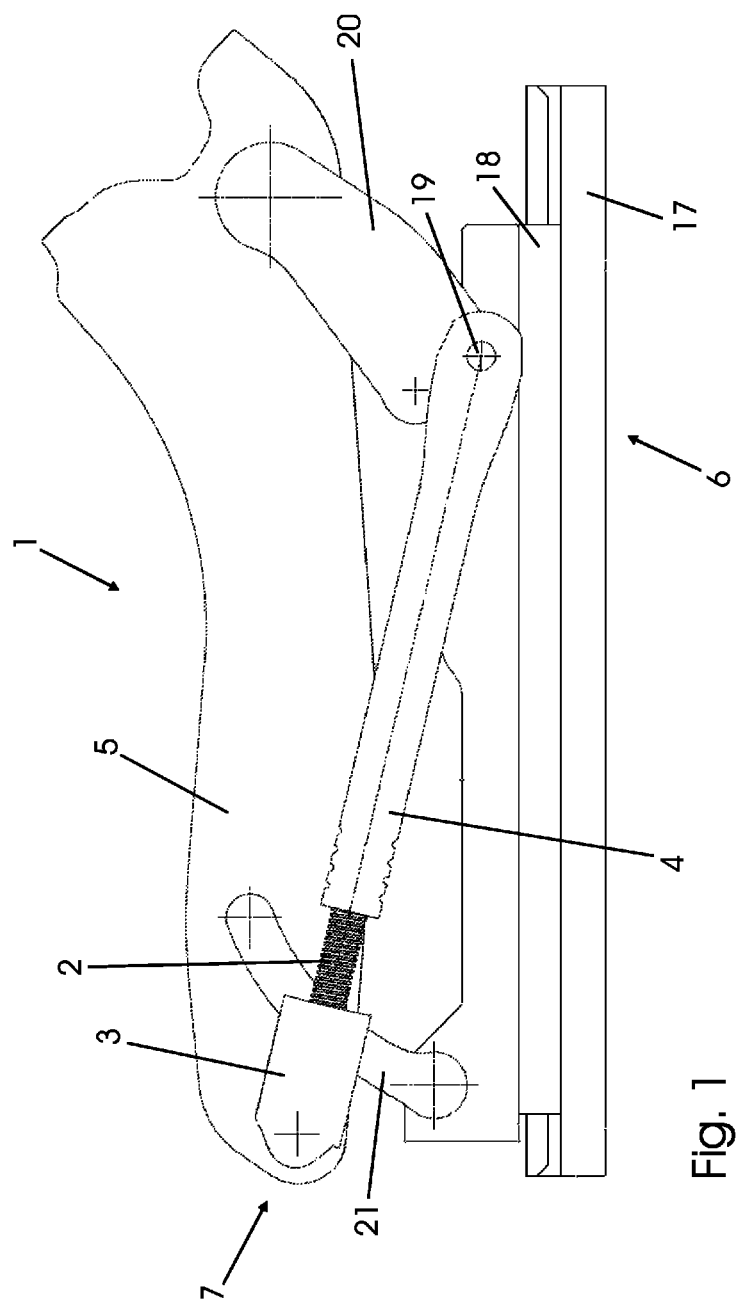

| DE | 10 2007 058 52-3 | A1 | 6/2009 |
|---|---|---|---|
| EP | 0 759 374 | A2 | 2/1997 |
| EP | 2 067 652 | A2 | 6/2009 |
| JP | 2000-085420 | | 3/2000 |
| JP | 2001-239861 | | 9/2001 |
| JP | 2006-335153 | | 12/2006 |
| JP | 2008-189303 | | 8/2008 |

* cited by examiner

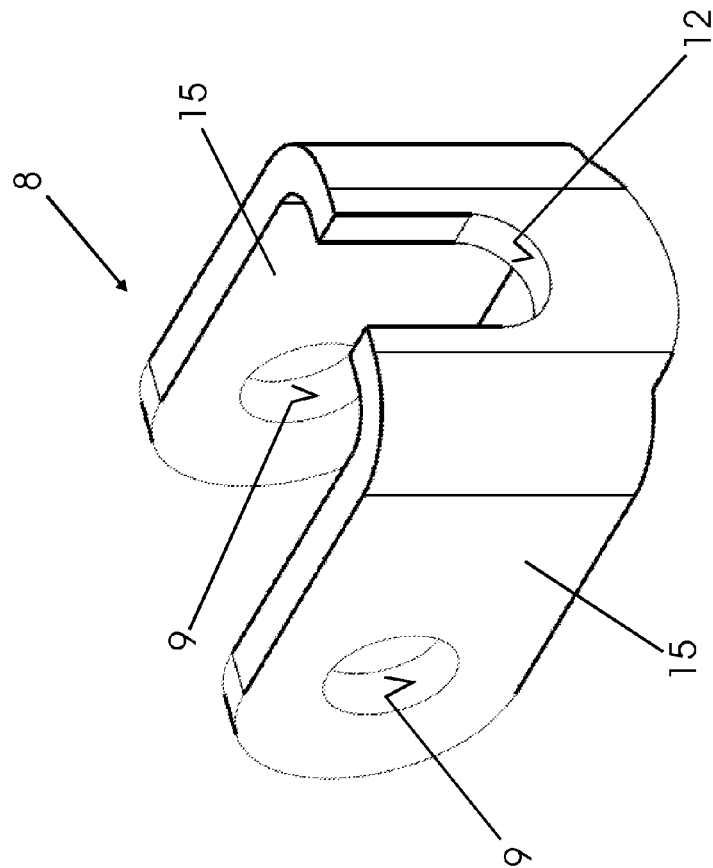
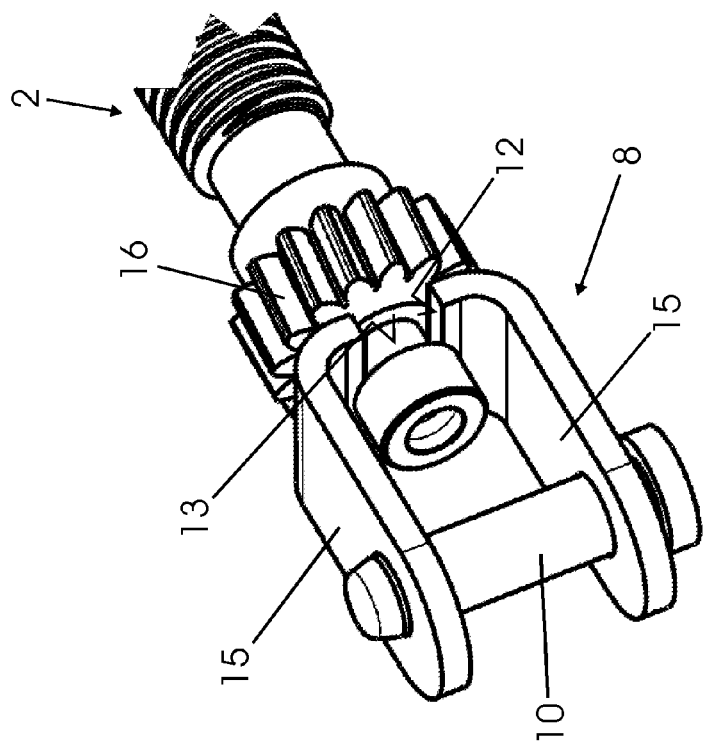
Fig. 4
Fig. 3

ADJUSTING DEVICE, IN PARTICULAR HEIGHT OR LONGITUDINAL ADJUSTING DEVICE FOR MOTOR VEHICLE SEATS

CROSS REFERENCE TO RELATED APPLICATIONS

The present application is a National Stage of International Application No. PCT/EP2011/053462 filed on Mar. 8, 2011, which claims the benefit of German Patent Application No. 10 2010 002 964.5 filed on Mar. 17, 2010, the entire disclosures of which are incorporated herein by reference.

The invention relates to an adjusting device, in particular height or longitudinal adjustment for motor vehicle seats, with
- a threaded spindle that is mounted so as to rotate on one end in a gearbox housing and on the other end in a receiving unit which has an inner thread matched to the threaded spindle, and
- a motor unit which is in operative connection with the threaded spindle.

The invention further relates to a seat base frame for motor vehicle seats with an adjusting device.

Motor vehicle seats for modern vehicles have a plurality of setting possibilities that allow the motor vehicle seat to be optimally adjusted to the respective person. For increasing the convenience when adjusting the motor vehicle seat, increasingly motor driven adjusting devices of the initially named type are used that can be actuated by means of appropriate operating controls. For adjusting individual regions of the seat, or respectively seat structures, with respect to each other, threaded spindles are preferably used, which in a receiving unit equipped with an inner thread according to the type of a nut-spindle mechanism, allow an adjustment of the seat structures with respect to each other. The adjusting devices, for this purpose, are connected on the one side to the seat structure to be adjusted and on the other side to a further seat structure, for example to a seat upper rail, against which the seat structure to be adjusted is movable, and allows a support of the adjusting mechanism.

In conjunction with the design of the motor vehicle seats with so-called integrated seatbelt buckles, that is, seatbelt buckles disposed directly on the motor vehicle seat and not disposed directly on the vehicle chassis, there is the construction dependent requirement that forces occurring in the event of a vehicle crash are to be transferred via the adjusting devices, in particular via a height adjustment. This means that in the event of this crash, the threaded spindle, the gearbox housing and the receiving unit are subject to an increased tensile and compressive stress. Here, it is mandatory to preclude failure of the adjusting device, in order to prevent a collapse of the motor vehicle seat receiving the person, because in the event of a crash the stability of the seat is significant for functioning protection of the occupant. This reference to a crash, as well subsequent references, applies to vehicle frontal impacts, or respectively rear impacts.

From the prior art, it is already known to provide a separate crash lock that in the event of a threatening, or occurring, collapse of the adjusting device stabilizes the seat structures, which are connected together by it, with respect to each other. Such crash locks have the disadvantage however that they lead to an increased net weight of the motor vehicle seat as well as to increased production costs of the motor vehicle seat due to additional components.

The object of the invention is to provide an adjusting device and a seat base frame for motor vehicle seats with an adjusting device that in the event of a crash transfers the forces that arise to a required degree.

The invention solves the object by an adjusting device with the features of claim 1, and by a seat base frame with the features of claim 15. Advantageous further developments of the adjusting device are specified in the claims 2 to 14. The adjusting device according to the invention is distinguished in that a reinforcing element is disposed in the gearbox housing such that in the event of a crash, it is suitable for absorbing forces acting in the direction of the longitudinal axis of the threaded spindle.

The invention is based on the realization that damage to the adjusting device results from the fact that in the event of a crash, in the case of integrated seatbelt buckles, there is an increased tensile loading of the adjusting device, which leads to the threaded spindle tearing out with respect to the gearbox housing. Just such a breakage of the connection between the threaded spindle and the gearbox housing is precluded in that a reinforcing element is disposed in the gearbox housing such that it transfers the forces occurring between the threaded spindle and the reinforcing element as well as the forces between the reinforcing element and the gearbox housing. The reinforcing element achieves this by a sufficiently large contact surface that must be determined on an individual basis, with the threaded spindle on the hand and the gearbox housing on the other hand. The use of the reinforcing element is distinguished in particular in that due to the particularly good transfer of force between the gearbox housing and the threaded spindle by the reinforcing element, further reinforcements of the threaded spindle and in particular of the gearbox housing, which can be regarded as critical, can be avoided such that the adjusting device overall has a barely increased net weight with respect to known adjusting devices that are not however suited for transferring crash forces.

The arrangement of the adjusting device in the gearbox housing can in principle occur in any manner, if it guarantees that forces occurring in the event of a crash are transferred between the gearbox housing and the threaded spindle. Thus, in particular, a design can be selected that alone is suitable for transferring the tensile forces acting on the threaded spindle in the event of a frontal crash of the vehicle. According to a particularly advantageous design of the invention, the reinforcing element is designed however for absorbing tensile and/or compressive forces acting on the threaded spindle in the longitudinal axis direction. The design of the invention, according to which both tensile as well as compressive forces are effectively transferred by the reinforcing element, increases the stability of the adjusting device in a supplemental manner and guarantees that a collapse of the adjusting device does not occur even in a crash situation that is not a frontal crash.

As already mentioned, the connection between the threaded spindle and the reinforcing element can be freely selected as long as it guarantees that in the event of a crash the reinforcing element remains operatively connected to the threaded spindle such that the occurring loads are effectively transferred between the threaded spindle and the reinforcing element. According to an advantageous design of the invention, it is provided that the reinforcing element during normal operation, that is, during the normal adjusting of the vehicle seat and in the adjusted position, is disposed without contacting the threaded spindle, so that the latter comes into contact with the reinforcing element only in the event of a crash. According to this further development of the invention, the reinforcing element and the threaded spindle, or respectively the contact surfaces of the threaded spindle and the reinforcing element that are interacting in the event of a crash, are disposed at a distance from each other and in the gearbox housing, so that they contact each other only in the event of a crash. This design has the advantage that during normal operation no friction is present between the threaded spindle and the reinforcing element. Grinding noises or frictional noises that would result in normal operation from contact between the reinforcing element and the threaded spindle are therefore excluded. Thereby, the production costs for the adjusting device according the invention can supplementarily be lowered, while at the same time the function is maintained.

Assuming an appropriate design of the reinforcing element, the disposition of the latter in the gearbox housing relatively opposite the threaded spindle already principally permits that the forces arising in the event of a crash are transmitted reliably from the reinforcing element to the gearbox housing via the predefined contact surface between the reinforcing element and the threaded spindle. The gearbox housing in turn is designed so that the forces arising in the event of a crash are also reliably transferred between the gearbox housing and the seating unit to be adjusted. According to a particularly advantageous design of the invention, however, the reinforcing element is disposed in the gearbox housing so that it is suitable on the one hand for connecting to a seating unit to be adjusted, and on the other hand for absorbing forces acting in the longitudinal axis direction of the threaded spindle in the event of a crash.

According to this design of the invention, the reinforcing element serves not only for a reliable transmission of the forces arising in the event of a crash between the reinforcing element and the threaded spindle, but beyond that is suitable for transferring the forces between the seating unit to be adjusted and the reinforcing element. This design of the invention makes it possible to dimension the gearbox housing independent of the forces existing in normal operation, or in the event of a crash, or only considering the loads occurring in the normal operation. All forces arising in the normal case and/or in the event of a crash can be transferred reliably to the reinforcing element. This makes it possible to design the gearbox housing particularly small and cost effectively, which supplementarily reduces the costs for the production of the adjusting device.

It is particularly advantageous that the reinforcing element for connecting to the seating unit to be adjusted has receiving openings for disposing connection means. This makes it possible to connect the adjusting device via the reinforcing element to the seating unit to be adjusted in a known manner such that a separate connection of the seating unit to the reinforcing element can be omitted. Connection means, such as connecting bolts for example, ideally extend through the gearbox housing and the reinforcing element as well as through appropriately formed receiving openings in the seating unit to be adjusted.

According to a particularly advantageous design of the invention, the reinforcing element is disposed so that during normal operation the connection means can be disposed at a distance from the receiving openings. This design of the invention makes it possible to avoid a special design of the receiving openings of the reinforcing element, because these openings then do not contact the connection means, for instance, a connecting bolt, during normal operation. In this respect, frictional loadings between the connection means and the receiving openings can be disregarded during the design of the adjusting device. This design of the invention provides for example that during normal operation, only the gearbox housing comes into contact with the connecting bolt, and the latter comes into contact with the receiving openings of the reinforcing element only in the event of a crash.

The design of the reinforcing element and the corresponding design of the threaded spindle can in principle be freely selected for transferring the forces occurring between the threaded spindle and the reinforcing element in the event of a crash. According to a particularly advantageous design of the invention, however, the reinforcing element has for this purpose an engagement groove for receiving a section of the threaded spindle having a circumferential indentation, wherein the reinforcing element during normal operation is preferably disposed at a distance from the indentation. According to this design of the invention, the reinforcing element has an open groove on one end, wherein the width of the groove is matched to an indentation of the threaded spindle, which in the installed state is disposed in the groove. Here, in the direction of the longitudinal axis of the threaded spindle, there is a following section of the threaded spindle that has a larger diameter than the engagement groove, at least in the direction of the gearbox housing. In the event of a crash, this region comes into contact with the region of the reinforcing element surrounding the engagement groove, such that via this, the forces can be effectively transferred between the reinforcing element and the threaded spindle.

During normal operation, the threaded spindle is disposed at a distance from the reinforcing element such that there is no friction present between the threaded spindle and the reinforcing element that would require a design for avoiding disruptions and/or grinding noises. Beyond this, the design of the reinforcing element with the engagement groove, being open on one side, permits a particularly simple installation of the adjusting device, wherein the threaded spindle with the circumferential indentation needs only to be inserted into the engagement groove.

According to a further design of the invention, the reinforcing element has a U-shape, wherein the free limbs are provided with receiving openings for the connection means and the section extending between the limbs has the engagement groove. This design of the invention is distinguished in that the reinforcing element can be produced in a particularly simple manner and can be easily disposed in the gearbox housing. The free limbs, via the receiving openings, allow the attachment to a seating unit to be adjusted, using a connection means. The section connecting the limbs makes it possible for the threaded spindle to be received in the engagement groove.

According to a further design of the invention, the connection means and/or the receiving openings have sliding properties, and in particular, are over-molded in plastic, at least in sections. According to this design of the invention, in the case of contact existing between the connection means and the receiving openings during normal operation, it is assured that a disruption-free operation is guaranteed, in that no Mocking or comfort-reducing disrupting noises arise. The sliding properties can be attained by an appropriate material selection or coating of the connection means or receiving openings. It is particularly advantageous to over-mold the contact surfaces with plastic, in order to hereby guarantee disruption-free operation.

Particularly in the case of producing the connection between the threaded spindle and the reinforcing element via an engagement groove in a section extending between the limbs, represented as an advantageous design, it is provided according to a particularly advantageous design of the invention that the section extending between the two limbs, preferably the region of the section disposed around the engagement groove, in particular the region of the section disposed below the engagement groove, has a greater material thickness compared to the free limbs, where the greater material thickness of a region around the engagement groove can also be realized with a reinforcing element without limbs for the connection to the seating unit to be adjusted. A corresponding design of the invention guarantees a transfer of the forces occurring in the event of a crash between the threaded spindle and the reinforcing element in a particularly reliable manner. In addition, a reinforcing of the region around the engagement groove prevents bending or ripping of the groove which could result in the threaded spindle disengaging from the reinforcing element.

As already depicted, the gearbox housing can be designed for transferring forces occurring in the event of a crash between the reinforcing element and the gearbox housing. With an appropriate design of the reinforcing element with receiving openings for connecting to the seating unit to be adjusted, a design for receiving only the forces occurring in normal operation is also possible, inasmuch as the connecting element is disposed at a distance from the receiving openings in normal operation. The gearbox housing can also be designed, however, without considering the forces that occur during normal operation, if the connection means contact the receiving openings of the reinforcing element also during normal operation.

According to a particularly advantageous design of the invention, the gearbox housing is comprised of a plastic material, in particular, a fiber-glass reinforced plastic material. A gearbox housing according to this further development of the invention is distinguished in that it is particularly lightweight and that it very reliably transfers the forces that occur. In particular, the use of a fiber-glass reinforced plastic material is distinguished in that even in the case of using the reinforcing element that is not suited for connecting the gearbox housing to the seating unit to be adjusted, all forces that occur can be absorbed and can be transferred to the seating unit.

The arrangement of the reinforcing element in the gearbox housing can occur in any manner. It is conceivable to design a gearbox housing such that the reinforcing element is simply inserted in the gearbox housing into a corresponding recess, and then is dosed by a housing cover or a second half of the housing. According to a further design of the invention, the gearbox housing is produced however by plastic over-molding surrounding the reinforcing element. This design of the invention is distinguished in that a particularly good connection that is free of play can be produced between the gearbox housing the reinforcing element. At the same time, the gearbox housing can be produced easily and cost-effectively.

The reinforcing element can be selected solely with the consideration of the forces to be transferred in the event of a crash. According to a particularly advantageous embodiment of the invention, the reinforcing element is designed as a stamped-bent part. This is distinguished in that it can be produced simply and inexpensively, so that a cost-effective production of the adjusting device can be guaranteed in a particular manner.

In principle, all types of drive units can be used for operating the adjusting device. According to a particularly advantageous further development of the invention, the motor unit is however formed by an electric motor, wherein a first gear element, in particular a worm, disposed on the output shaft of the electric motor, is engaged in the gearbox housing with a second gear element, particularly a worm gear, disposed on the threaded spindle in the region of the gearbox housing, for driving the threaded spindle. This design of the invention is distinguished by the fact that the force transfer between the electric motor and the threaded spindle takes place encapsulated in the gearbox housing where the connection is protected from external influences. This effectively precludes contamination of the operative connection between the first and second gear element, whereby the reliability of the adjusting device can be increased in a supplementary manner. The use of a worm gear as well as of a worm is distinguished in a particular manner, in that it permits a particularly reliable and quiet transfer.

Characteristic for the seat base frame according to the invention for a motor vehicle seat with an adjusting device connecting a first and a second seat structure that are adjustable with respect to each other, is that the receiving unit with the end thereof facing away from the gearbox housing is connected to the first seat structure, and the gearbox housing is connected to the second seat structure. This guarantees that the adjusting device transfers the forces occurring in the event of a crash between the first and the second seat structure. Due to the particular design of the adjusting device, it is guaranteed in a particular manner that the adjusting device does not break, due to which the support function of the seat would be lost with respect to the person located in the seat.

Figure 2:
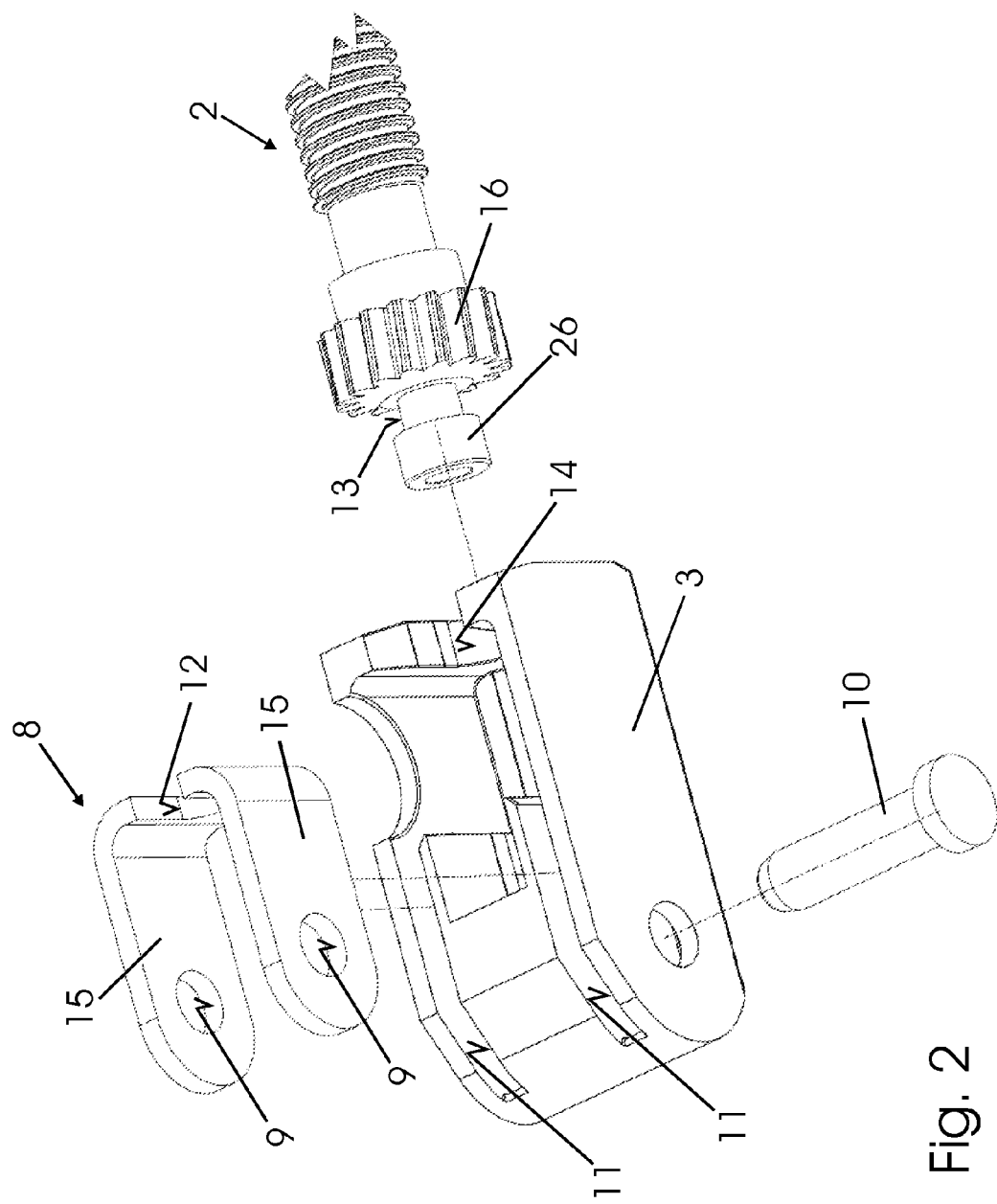
Figure 5:
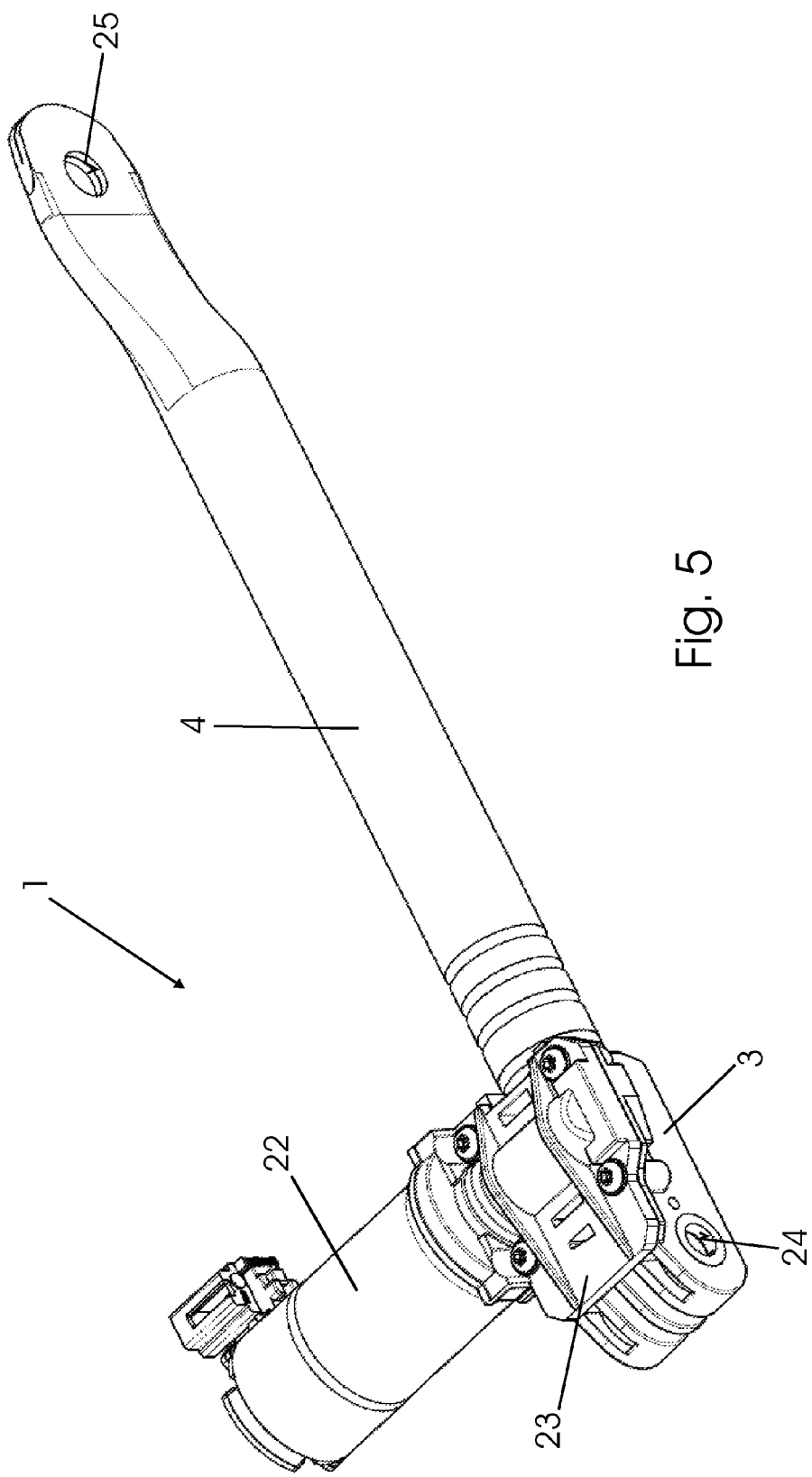
Figure 7:
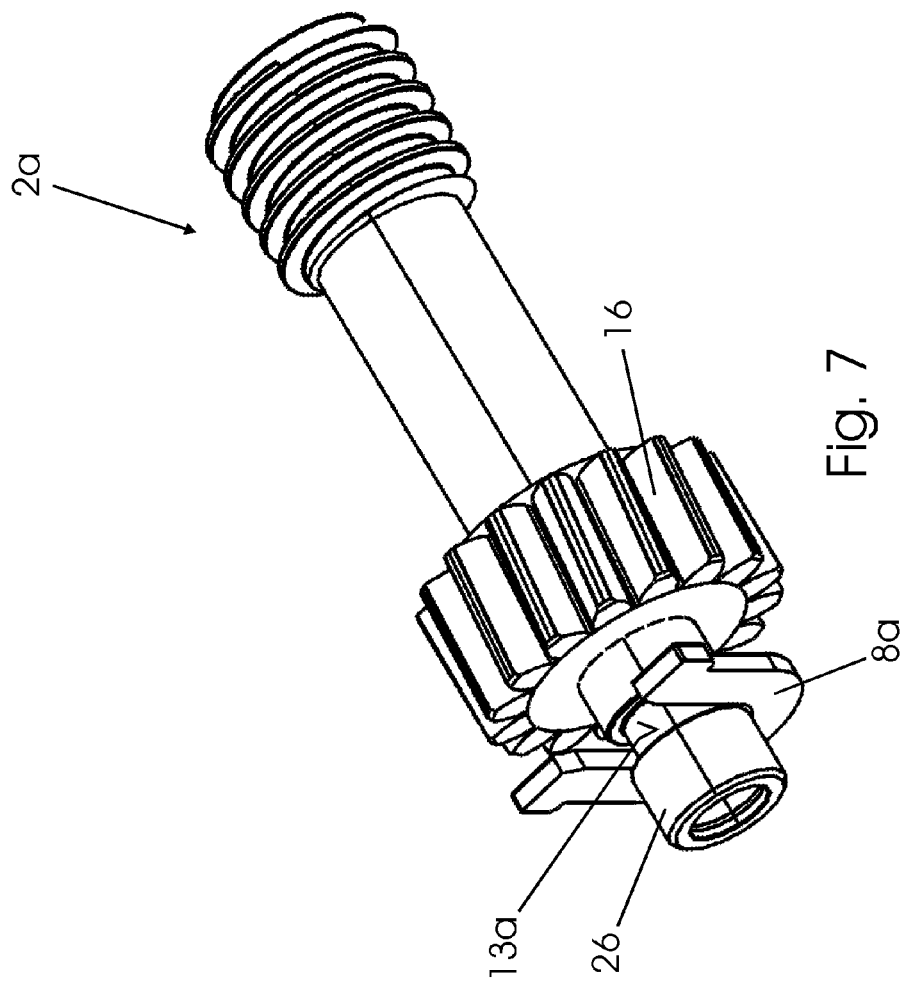
Figure 6:
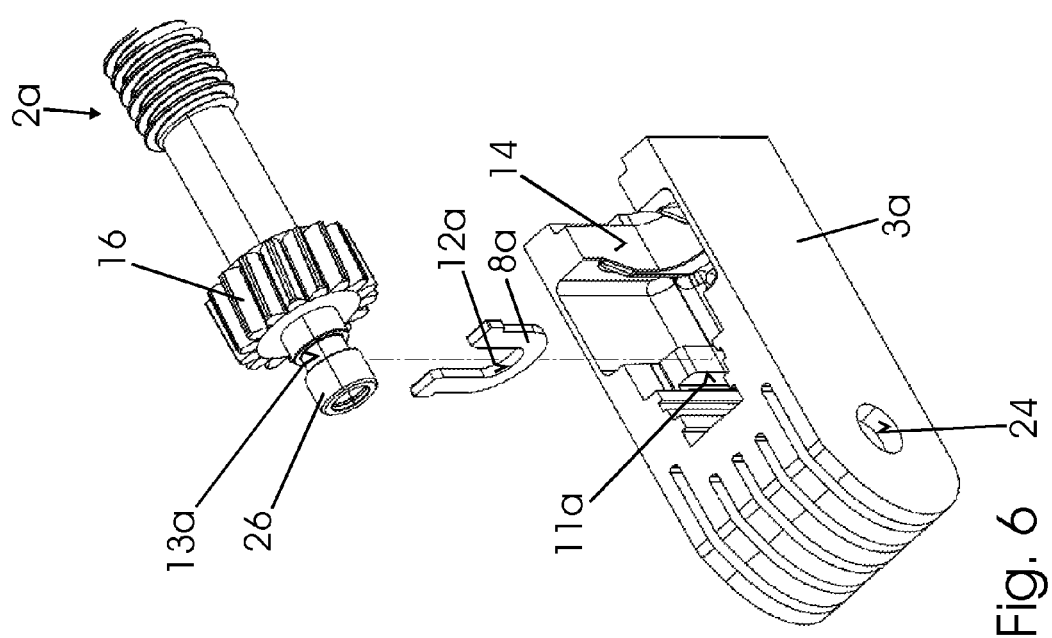
Figure 8:
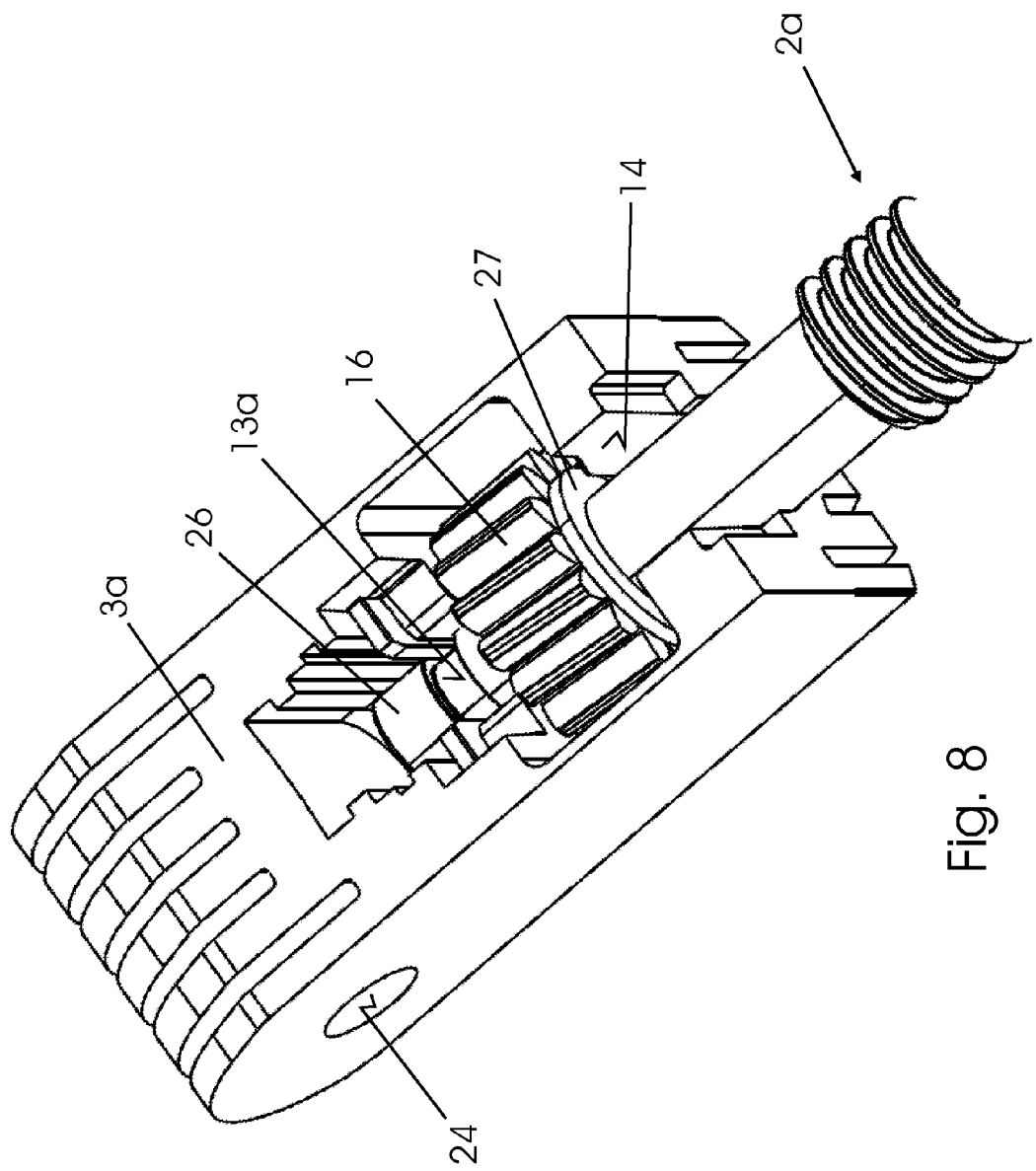

Example embodiments of the invention are described in more detail with reference to the drawings. The drawings show:

FIG. 1 a sketch of a side view of a partial region of a motor vehicle seat with an adjusting device disposed thereon;

FIG. 2 an exploded representation of a gearbox housing in a perspective view, with a section of a threaded spindle disposed in the gearbox housing;

FIG. 3 a perspective view of a threaded spindle in engagement with a reinforcing element;

FIG. 4 a perspective view of a reinforcing element;

FIG. 5 a perspective view of the adjusting device from FIG. 1 with a motor unit in the installed state;

FIG. 6 an exploded representation of a threaded spindle, a reinforcing element and a gearbox housing of a second embodiment of the adjusting device from FIG. 5;

FIG. 7 a perspective view of the threaded spindle in interaction with the reinforcing element, and FIG. 8 a perspective view of a gearbox housing with the threaded spindle of a third embodiment of an adjusting device disposed therein.

FIG. 1 shows a schematic representation of a partial region of a motor vehicle seat with an adjusting device 1 disposed thereon. The adjusting device 1 extends between a seating unit 5 and a seat upper rail 18, which for its part is movably mounted at a seat lower rail 17 that can be disposed on the floor of the vehicle.

The adjusting device 1, shown in perspective in FIG. 5, that allows an adjustment of the seat height, has on the one end a gearbox housing 3 that is connected in an articulated manner to the seating unit 5, and on the other end, at the end located opposite from the gearbox housing 3, has a receiving unit 4 in the shape of a stay tube which is connected in an articulated manner via a joint bolt 19 to the seat upper rail 18 of the motor vehicle seat. The adjusting device 1 permits a height adjustment of the seating unit 5 with respect to the seat lower rail 17, or respectively the seat upper rail 18, by turning of the threaded spindle 2 by means of a motor unit 22 disposed at the gearbox housing 3. The seat height adjustment of the seating unit 5 results in the process from a change in length of the adjusting device 1, caused by the turning of the treaded spindle 2 with respect to the stay tube, which has an internal thread matched to the threaded spindle 2. By turning the threaded spindle 2, the distance between the joint bolt 19 and the gearbox housing 3 changes. Due to the articulated connection of the seating unit 5 to the seat upper rail 18 via two linkages 20, 21, the change in length of the adjusting device 1 results in a change in height of the seating unit 5. Thus, the adjusting device 1 allows a relative adjustment of the first seat structure 6, formed by the seat lower rail 17 and the seat upper rail 18, with respect to the second seat structure 7, formed by the seating unit 5.

For the connection of the threaded spindle 2 to the motor unit 22, a gear element in the shape of a worm gear 16 is disposed on the threaded spindle 2, which in the installed state of the adjusting device 1 is in engagement with a gear element of the motor unit 22. The threaded spindle 2 is mounted so as to rotate in the gearbox housing 3 such that the worm gear 16 interacts, within the gearbox housing 3, with the gear element of the motor unit 22 (see FIG. 2).

The gearbox housing 3 has a reinforcing element 8 inserted in a recess 11 of the gearbox housing 3. In the event of a crash, the reinforcing element 8 transfers the forces acting on the seat structure 7 directly onto the threaded spindle 2, and thereby onto the first seat structure 6. The reinforcing element 8 is designed having a U-shape for connecting the second seat structure 7 to the threaded spindle 2, and has a receiving opening 9 on each of the free limbs thereof, and in the section extending between the limbs 15, connecting the free limbs 15, has an engagement groove 12 open on one side. In the installed state of the adjusting device 1 and at the seating unit 5 to be adjusted, a connecting bolt 10 extends through the gearbox housing 3 and through the receiving openings 9, and the threaded spindle 2 is disposed with a circumferential indentation 13 in the groove 12 of the reinforcing element 8. A threaded spindle head 26, adjacent to the indentation 13 and extending in the direction of the gearbox housing 3, has a larger diameter than that of the engagement groove 12. In the event of a crash, there is an interaction of the threaded spindle head 26 with the reinforcing element 8, such that the threaded spindle 2 cannot be pulled out of the gearbox housing 3.

The force transfer occurs via the sides of the threaded spindle head 26 and the reinforcing element 8 facing each other, which come into contact with each other only as a consequence of crash loading, because during normal operation they are disposed at a distance from each other in order to avoid frictional noises.

The fastening bolt 10 which in the installed state extends through the gearbox housing 3 and also through the receiving opening 9 of the reinforcing element 8, serves for connecting the gearbox housing 3 to the seating unit 5 and for transferring the forces acting in the event of an accident. Therefore, forces occurring in the event of a crash can be transferred directly between the seating unit 5 via the reinforcing element 8 to the threaded spindle 2. A loading of the gearbox housing 3, which could lead to the damage thereof, or respectively to the threaded spindle 2 ripping out of the gearbox housing 3, is therefore effectively prevented.

FIG. 3 shows the reinforcing element 8 for illustrating the function thereof in interaction with the threaded spindle 2, in which the recess 13 of the threaded spindle 2 is disposed in the engagement groove 12 of the reinforcing element 8. The reinforcing element 8 has below the engagement groove 12 a broadening of the material which confers an increased stability to the reinforcing element 8, in order to prevent bending of the component formed as a sheet metal punched part (see FIG. 4).

The adjusting device 1 shown in perspective in FIG. 5, in the installed state with an attached motor unit 22 and with a housing cover 23 closing the gearbox housing 3, does not differ substantially from the adjusting devices 1a shown in the following. The receiving unit 4 is formed by the stay tube, which on the end thereof opposite from the gearbox housing 3, 3a, in a flattened region, has an opening 25 for receiving fastening means, by means of which the adjusting device 1, 1a can be connected in an articulated manner to a seat upper rail 18.

The stay tube on the end thereof facing toward the gearbox housing 3, 3a, has an inner thread with which it is in engagement with the outer thread of the threaded spindle 2, 2a. With the end of the threaded spindle 2, 2a having a worm gear 16, and being located opposite from the stay tube, the spindle is mounted so as to rotate in the gearbox housing 3, 3a, wherein the threaded spindle 2, 2a extends through a recess 14 of the gearbox housing 3, 3a.

The second embodiment of the adjusting device 1a, shown in the FIGS. 6 and 7, differs from the previously represented adjusting device 1 in particular by the differing shape of the reinforcing element 8a. This element does not have any limbs 15 for connecting to a seating unit to be adjusted, rather is formed as a U-shaped disk, wherein the free limbs form an engagement groove 12a for a circumferential indentation 13a on the threaded spindle 2a.

The reinforcing element 8a is disposed in a recess 11a of the gearbox housing 3a and fastened in the axial direction of the threaded spindle 2a. The threaded spindle 2a, for its part, is operatively connected in axial direction to the reinforcing element 8a via the surfaces of the indentation 13a. The contact surfaces between the reinforcing element 8a and the recess 11a of the gearbox housing 3a and between the threaded spindle 2a and the reinforcing element 8a are dimensioned such that loading of the adjusting device 1a occurring in the event of a crash is reliably transferred from the gearbox housing 3a via the reinforcing element 8a to the threaded spindle 2a, without resulting in a collapse of the threaded spindle 2a. In the event of an accident, the force is transferred via the seating unit 5 to be adjusted to the gearbox housing 3a, which is appropriately designed. The gearbox housing 3a, for connecting to the seating unit 5, has receiving openings 24 for receiving connection means, such as fastening bolts 10.

FIG. 8 shows a possible arrangement of the threaded spindle 2a in the gearbox housing 3a of a further embodiment of the adjusting device. In comparison to the second embodiment of the adjusting device 1a shown in the FIGS. 6 and 7, the arrangement of the threaded spindle 2a in the gearbox housing 3a differs in that a second U-shaped reinforcing element 27 is disposed between the worm gear 16 and the section of the gearbox housing 3a having the recess 14. This element abuts on the one side on the region of the gearbox housing 3a surrounding the recess 14 and on the other side on the worm gear 16, wherein an arrangement can also be selected in which the second reinforcing element 27 comes into contact with the worm gear 16 and/or the gearbox housing 3a only in the event of a crash.

The second reinforcing element 27, by supplementarily enlarging the contact surfaces, counteracts a collapse of the threaded spindle 2a in the case of loads occurring as a consequence of a crash. For increasing the reliability, the worm gear 16 can be disposed on a circumferential shoulder of the threaded spindle 2a, which offers improved support for the reinforcing element 27 in the event of a crash.

The invention claimed is:

1. An adjusting device for height or longitudinal adjustment of motor vehicle seats, comprising:
   a threaded spindle that is mounted, so as to rotate, on one end in a gearbox housing and on the other end in a receiving unit which has an inner thread matched to the threaded spindle, and
   a motor unit which is in operative connection with the threaded spindle, wherein a reinforcing element is disposed in the gearbox housing such that it is suited for absorbing forces acting in the longitudinal axis direction of the threaded spindle, wherein the reinforcing element has receiving openings for disposing a connector for connecting to the seating unit to be adjusted.

2. The adjusting device according to claim 1, wherein the reinforcing element is designed for receiving tensile and compressive forces acting in the longitudinal axis direction on the threaded spindle.

3. The adjusting device according to claim 1, wherein the reinforcing element during normal operation is disposed without contact with respect to the threaded spindle such that the spindle comes into contact with the reinforcing element only when forces are acting on the threaded spindle in the longitudinal axis direction.

4. The adjusting device according to claim 1, wherein the reinforcing element is disposed in the gearbox housing so that it is suitable on the one hand for connecting to a seating unit to be adjusted, and on the other hand for absorbing forces acting in the longitudinal axis direction of the threaded spindle.

5. The adjusting device according to claim 1, wherein the reinforcing element is disposed so that during normal operation the connector can be disposed at a distance from the receiving openings.

6. The adjusting device according to claim 1, wherein the reinforcing element has an engagement groove for receiving a section of the threaded spindle having a circumferential indentation.

7. The adjusting device according to claim 1, wherein the reinforcing element is designed in a U-shape, wherein free limbs are provided with receiving openings for the connector, and a section extending between the limbs has the engagement groove.

8. The adjusting device according to claim 1, wherein the connector and/or the receiving openings have sliding properties, wherein the connector and/or the receiving openings are over-molded with plastic at least in sections.

9. The adjusting device according to claim 7, wherein the section extending between the two limbs has a greater material thickness than the free limbs.

10. The adjusting device according to claim 1, wherein the gearbox housing is formed from a plastic material.

11. The adjusting device according to claim 1, wherein the gearbox housing is produced encompassing the reinforcing element by plastic over-molding.

12. The adjusting device according to claim 1, wherein the reinforcing element is formed as a stamped-bent part.

13. The adjusting device according to claim 1, wherein the motor unit is formed by an electric motor, wherein a first gear element, disposed on the output shaft of the electric motor, is engaged in the gearbox housing with a second gear element disposed on the threaded spindle in the region of the gearbox housing, for driving the threaded spindle.

14. A seat base frame for motor vehicle seats with the adjusting device according to claim 1, with a first and a second seat structure that can be moved relative to each other, wherein the receiving unit with the end thereof facing away from the gearbox housing is connected to the first seat structure, and the gearbox housing is connected to the second seat structure.

15. The adjusting device of claim 6, wherein during normal operation the reinforcing element is disposed at a distance from the indentation.

16. The adjusting device of claim 9, wherein the section extending between the two limbs is a region of the section disposed around the engagement groove.

17. The adjusting device of claim 16, wherein the region of the section is disposed below the engagement groove.

* * * * *